(12) United States Patent
Siedlikowski et al.

(10) Patent No.: US 6,741,232 B1
(45) Date of Patent: May 25, 2004

(54) USER INTERFACE FOR A DATA PROCESSING APPARATUS

(75) Inventors: Andrew Siedlikowski, San Francisco, CA (US); Tony Robinson, Palo Alto, CA (US)

(73) Assignee: Good Technology, Inc., Sunnyvale, CA (US)

( * ) Notice: Subject to any disclaimer, the term of this patent is extended or adjusted under 35 U.S.C. 154(b) by 0 days.

(21) Appl. No.: 10/056,313

(22) Filed: Jan. 23, 2002

(51) Int. Cl.⁷ .................................................. G09G 5/00
(52) U.S. Cl. ....................... 345/156; 345/167; 345/169; 345/184
(58) Field of Search ................................ 345/156, 157, 345/163, 167, 169, 184

(56) References Cited

U.S. PATENT DOCUMENTS

| | | | | | |
|---|---|---|---|---|---|
| 5,396,265 A | * | 3/1995 | Ulrich et al. | ................ | 345/158 |
| 5,825,353 A | * | 10/1998 | Will | ........................... | 345/184 |
| 5,835,732 A | * | 11/1998 | Kikinis et al. | .............. | 710/303 |
| 5,915,228 A | * | 6/1999 | Kunihiro et al. | ............. | 455/575 |
| 6,215,490 B1 | * | 4/2001 | Kaply | ........................ | 345/788 |
| 6,297,795 B1 | * | 10/2001 | Kato et al. | .................. | 345/684 |
| 6,489,950 B1 | * | 12/2002 | Griffin et al. | ............... | 345/168 |
| 2001/0012025 A1 | * | 8/2001 | Wojaczynski et al. | ...... | 345/856 |
| 2003/0006959 A1 | * | 1/2003 | Varanda | ...................... | 345/156 |

* cited by examiner

*Primary Examiner*—Bipin Shalwala
*Assistant Examiner*—Ricardo Osorio
(74) *Attorney, Agent, or Firm*—Blakely, Sokoloff Taylor & Zafman, LLP

(57) ABSTRACT

A user interface for a data processing device is described comprising: an input wheel rotatably mounted to the data processing device and configured to generate input signals to the data processing device when rotated or clicked down, wherein clicking and holding down the input wheel for less than a threshold amount of time causes a first function to be executed by the data processing device, and wherein clicking and holding down the input wheel for greater than the threshold amount of time causes a second function to be executed by the data processing device.

32 Claims, 19 Drawing Sheets

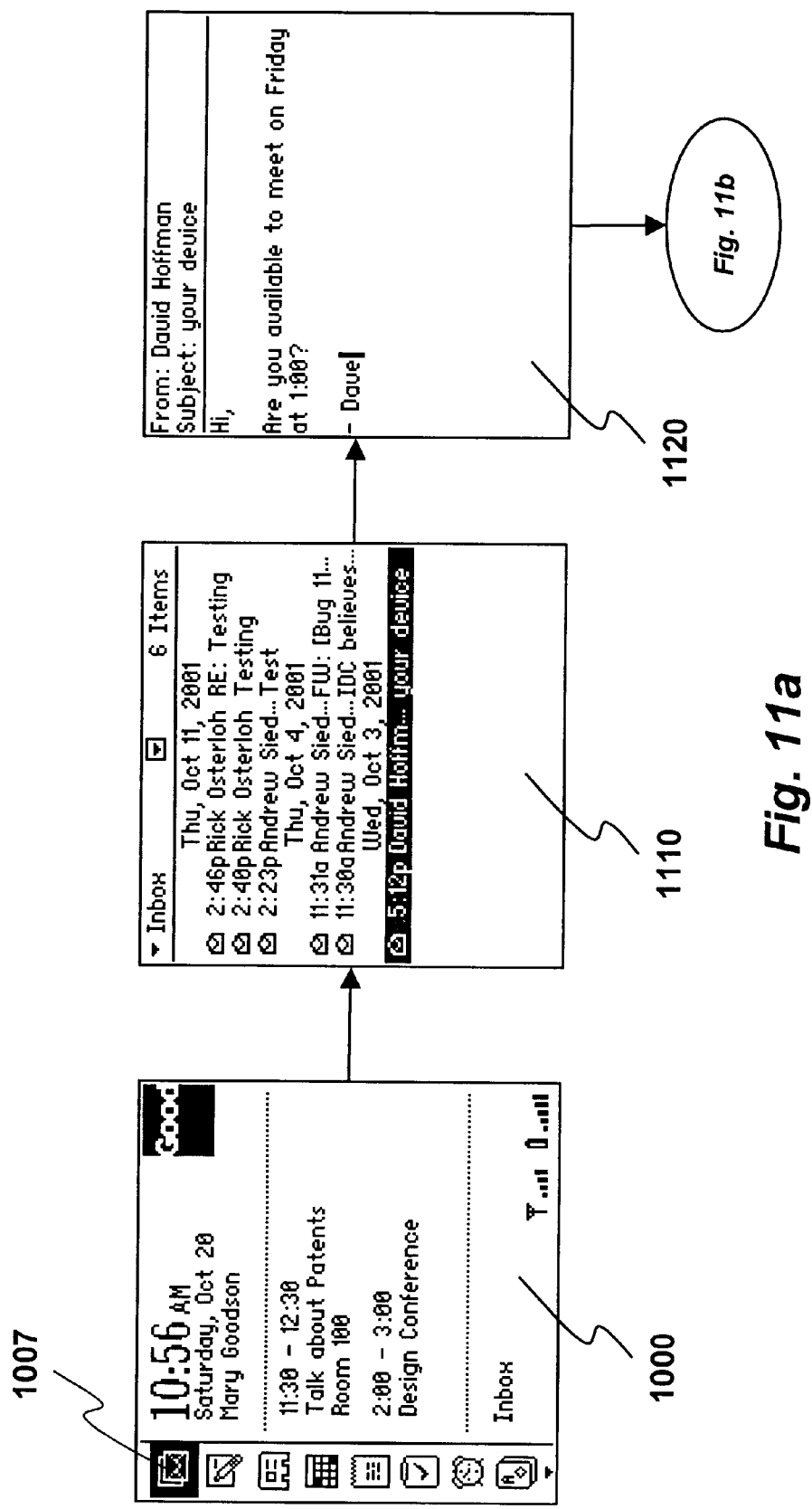

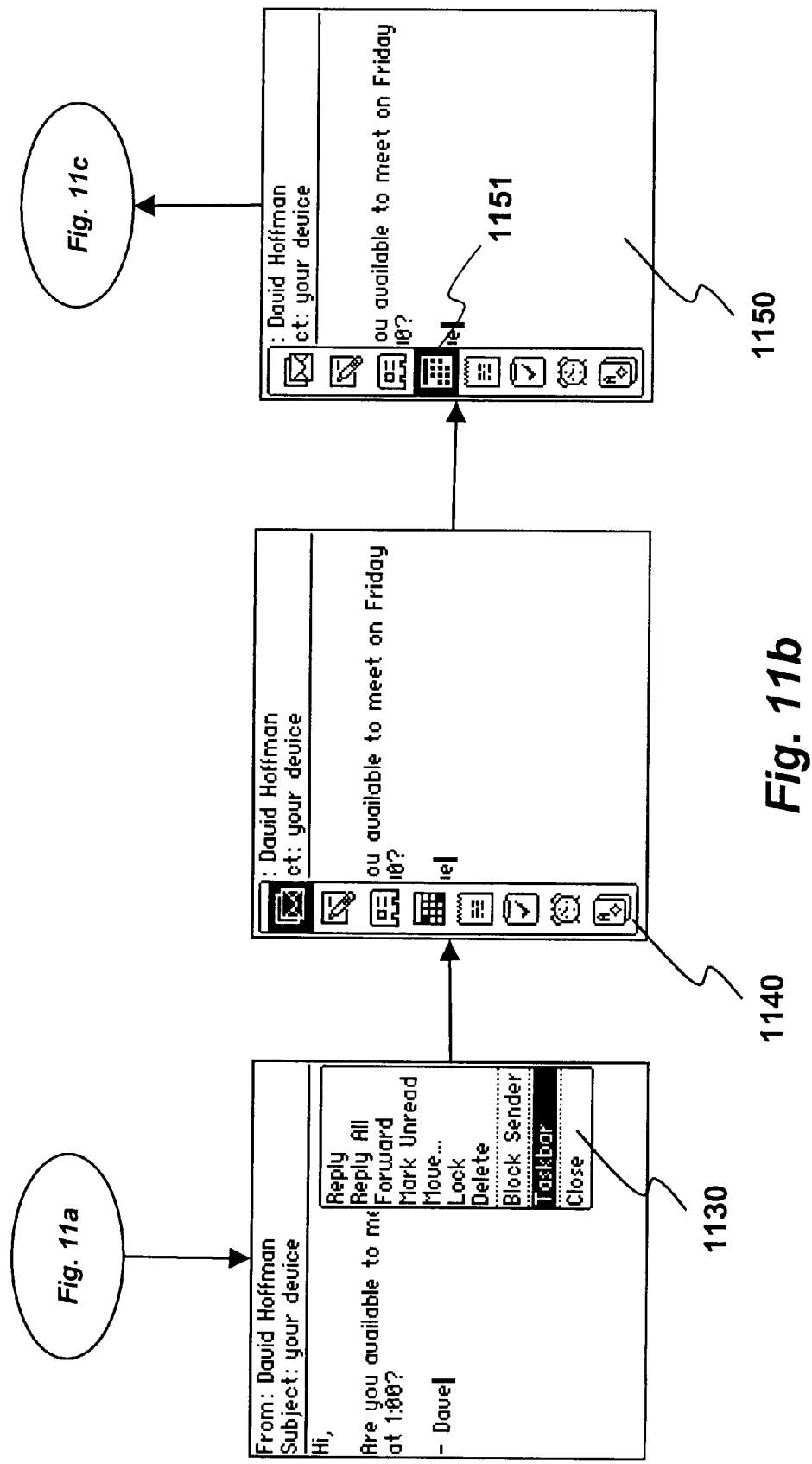

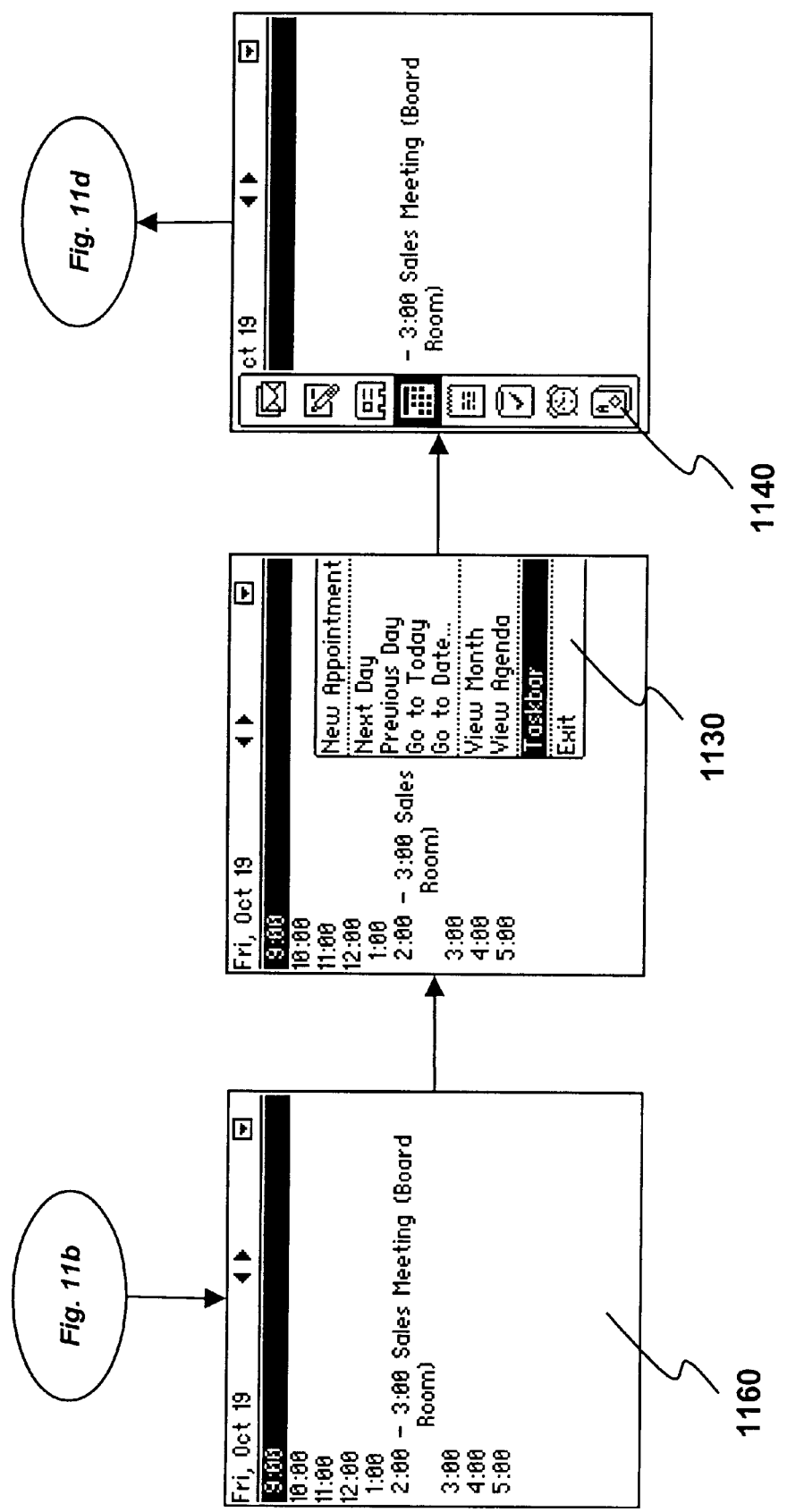

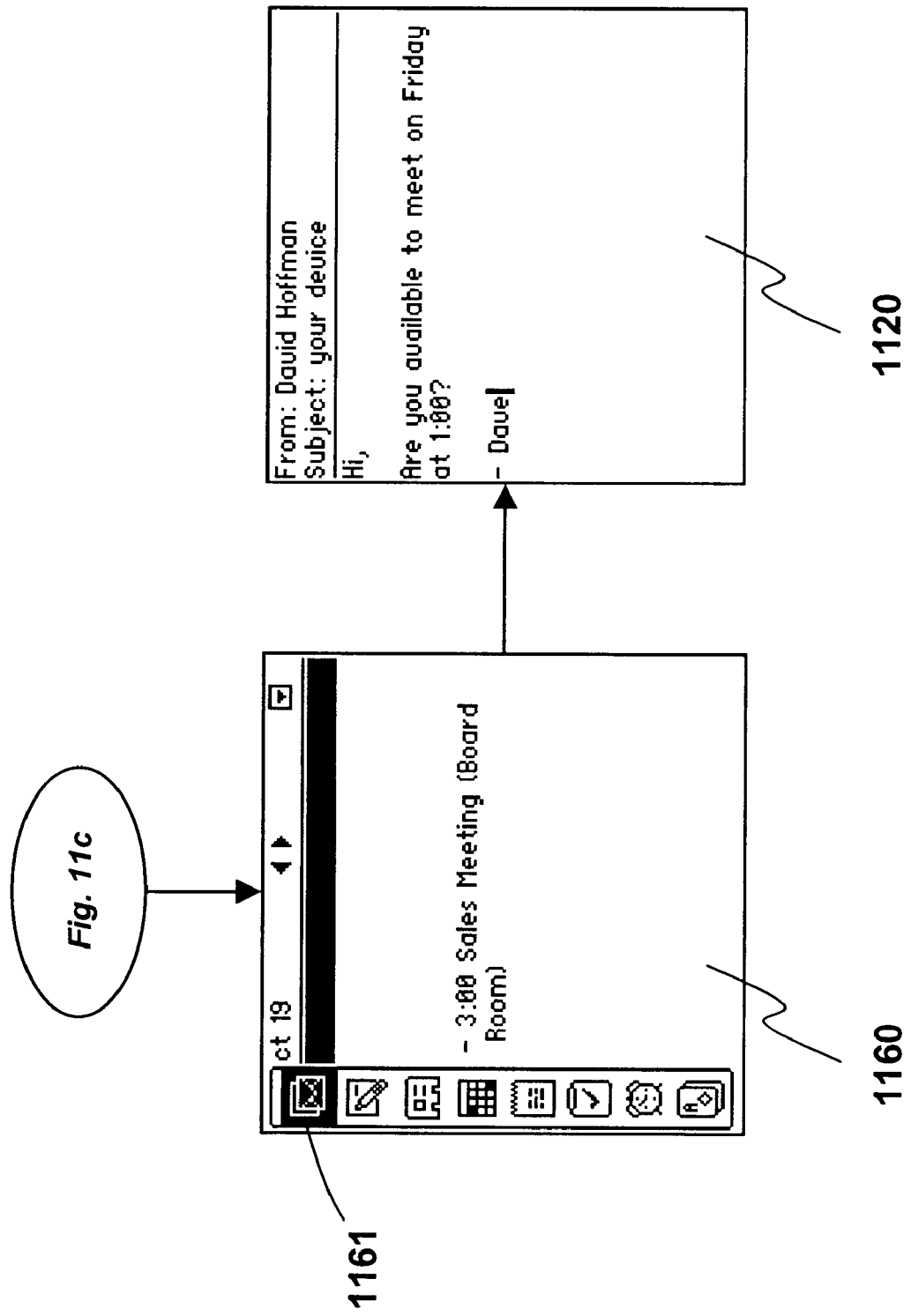

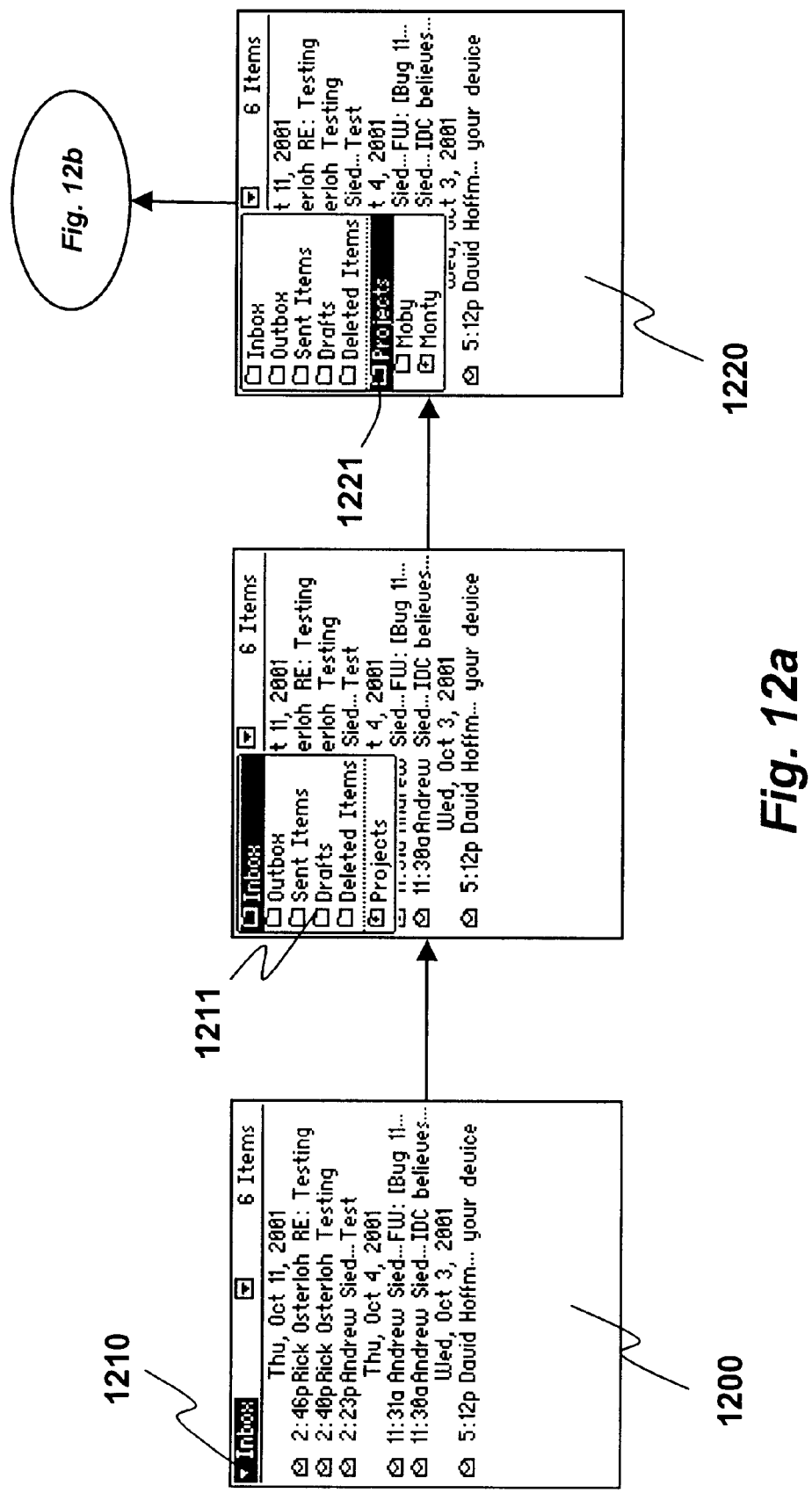

USER INTERFACE FOR A DATA PROCESSING APPARATUS

BACKGROUND

1. Field of the Invention

This invention relates generally to the field of wireless data systems. More particularly, the invention relates to an improved user interface for a wireless device.

2. Description of the Related Art

A variety of wireless data processing devices have been introduced over the past several years. These include wireless personal digital assistants ("PDAs") such as the Palm® VIIx handheld, cellular phones equipped with data processing capabilities, and, more recently, corporate wireless messaging devices such as the Blackberry™ wireless pager developed by Research In Motion ("RIM").™

With advances in silicon processing technology, data processing devices and cellular phones continue to decrease in size. Smaller size, however, creates new challenges related to usability. For example, as data processing devices get smaller, the real estate available on the device available for data input decreases. As such, it may be necessary to reduce the amount of input required from a user to perform tasks on the data processing device. An additional challenge is that smaller data processing devices typically require smaller displays which may be difficult to read. Accordingly, data may need to be presented to the user in a more compact, intelligent, efficient manner.

Accordingly, what is needed is an improved user interface for a wireless data processing device.

SUMMARY

A user interface for a data processing device is described comprising: an input wheel rotatably mounted to the data processing device and configured to generate input signals to the data processing device when rotated or clicked down, wherein clicking and holding down the input wheel for less than a threshold amount of time causes a first function to be executed by the data processing device, and wherein clicking and holding down the input wheel for greater than the threshold amount of time causes a second function to be executed by the data processing device.

BRIEF DESCRIPTION OF THE DRAWINGS

A better understanding of the present invention can be obtained from the following detailed description in conjunction with the following drawings, in which:

FIGS. 11a–d illustrate task switching according to one embodiment of the invention.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

An Exemplary Handheld Device

Figure 1:
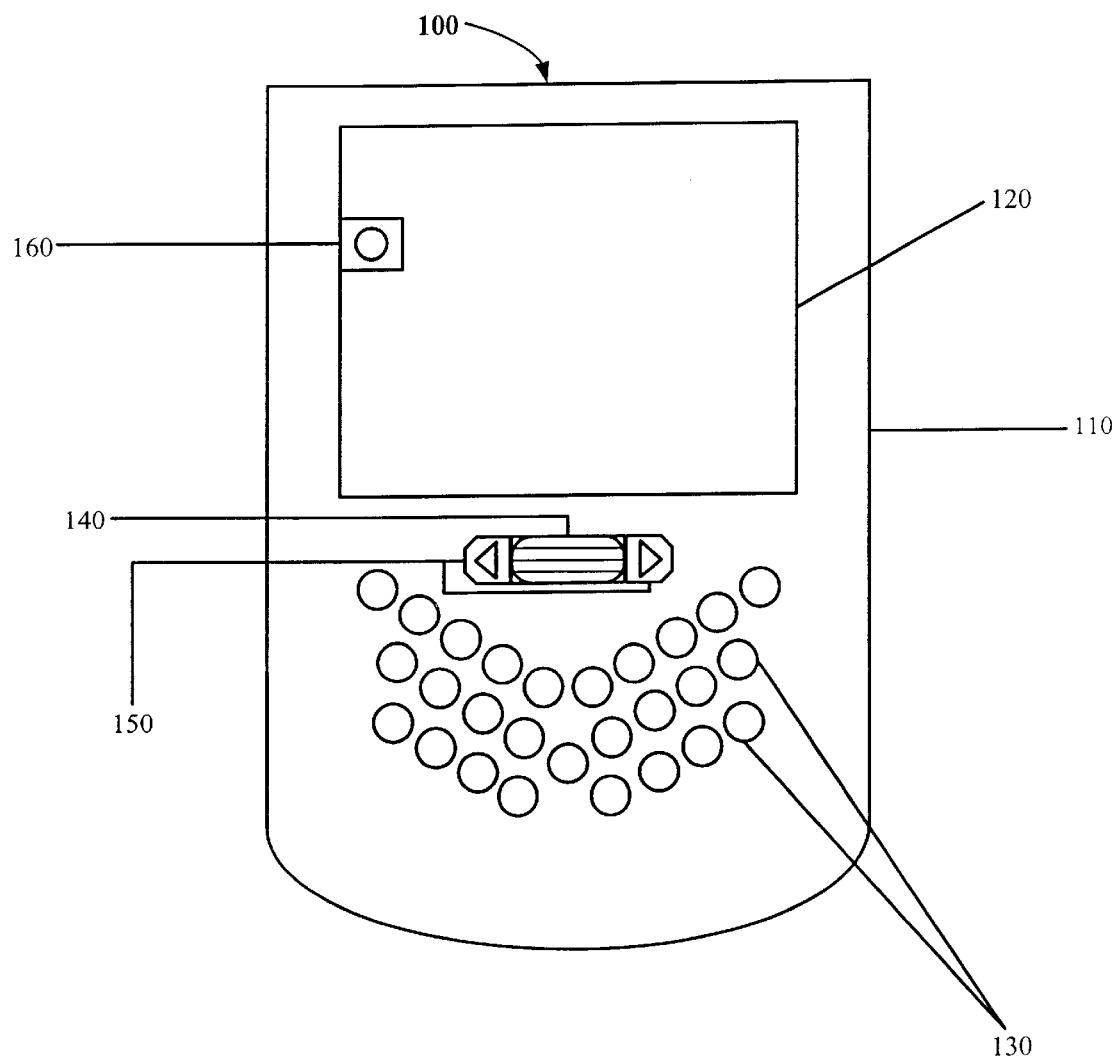
FIG. 1 illustrates one embodiment of a data processing apparatus on which features of the invention are implemented.

FIG. 1 illustrates a handheld data processing device 100 for implementing embodiments of the invention. In one embodiment, the data processing device 100 is a wireless messaging device which maintains complete synchronization with a user's email, electronic calendar, contacts, tasks and notes (and/or any other type of user information) when the user is out of the office. However, the data processing device 100 may serve various other functions while still complying with the underlying principles of the invention (e.g., the device may be a standard personal digital assistant ("PDA") or cellular phone with data processing capabilities).

As illustrated, the data processing device 100 includes a housing 110, display 120, keyboard 130, thumbwheel 140, navigation buttons 150, and light sensor 160. The housing 110 encloses a printed circuit board that includes various electronic components mounted thereon including, for example, a volatile memory (e.g., RAM) and/or a non-volatile memory (e.g., ROM, Flash memory, . . . etc) and a processor for processing data and program code. In one embodiment, housing 110 is an elongated structure that fits in the palm of a user. The display 120 is mounted within the housing 110 and includes an image projecting mechanism that generates text and graphic images as described in detail below.

In one embodiment, the display 120 is implemented with a liquid crystal display ("LCD"). In yet a further embodiment, the LCD is a reflective-transmissive LCD (e.g., 30% transmissive and 70% reflective). However, one of ordinary skill in the art will appreciate that the underlying principles of the invention are not limited to any particular display type.

The keyboard 130 mounted on the housing 110, is the primary text input device. In one embodiment, the keyboard includes a standard arrangement of alphabetic keys (e.g., the "QWERTY" keyboard). Also, in one embodiment, the keyboard 230 includes standard function keys, such as an Escape key, a tab key, shift and/or control keys. As illustrated, in one embodiment, the keyboard 130 has an upward slant, center spine configuration.

The upward slant configuration enables a user to easily access all of the keys on keyboard 130 with minimal hand movement. For example, a user may easily make a transition from a key in the middle of keyboard 130 (e.g., the Y key) to a key on the outside of keyboard 130 (e.g., the P key) with natural thumb movement. In addition, the keyboard 130 may include backlighting that enables a user of handheld device 100 to view the keys of keyboard 130 in dark or dim lighting.

In one embodiment, the thumbwheel 140 and navigation buttons 150 provide a cursor control mechanism, allowing a user to scroll up and down and select information from a graphical user interface ("GUI") generated on the display 120. In one embodiment, the thumbwheel 140 may be depressed and released as a button. In one embodiment, simply clicking and releasing the thumbwheel performs a first type of function (e.g., like a Windows left mouse click) whereas clicking and holding the thumbwheel performs a second type of function (e.g., like a Windows right button mouse click). For example, clicking the thumbwheel may open an item or activate a widget whereas holding the thumbwheel may bring up a menu of commands (e.g., context and/or application-level commands). Incorporating two functions in a single selection element provides for a more efficient use of the selection element and is particularly beneficial on a small device with a small display screen.

Embodiments of a Graphical User Interface

Various GUI features will now be described with respect to FIGS. 2 through 14. It should be noted, however, that many of the specific details set forth below are for the purpose of illustration only and are not necessarily required for practicing the underlying principles of the invention.

Figure 2:
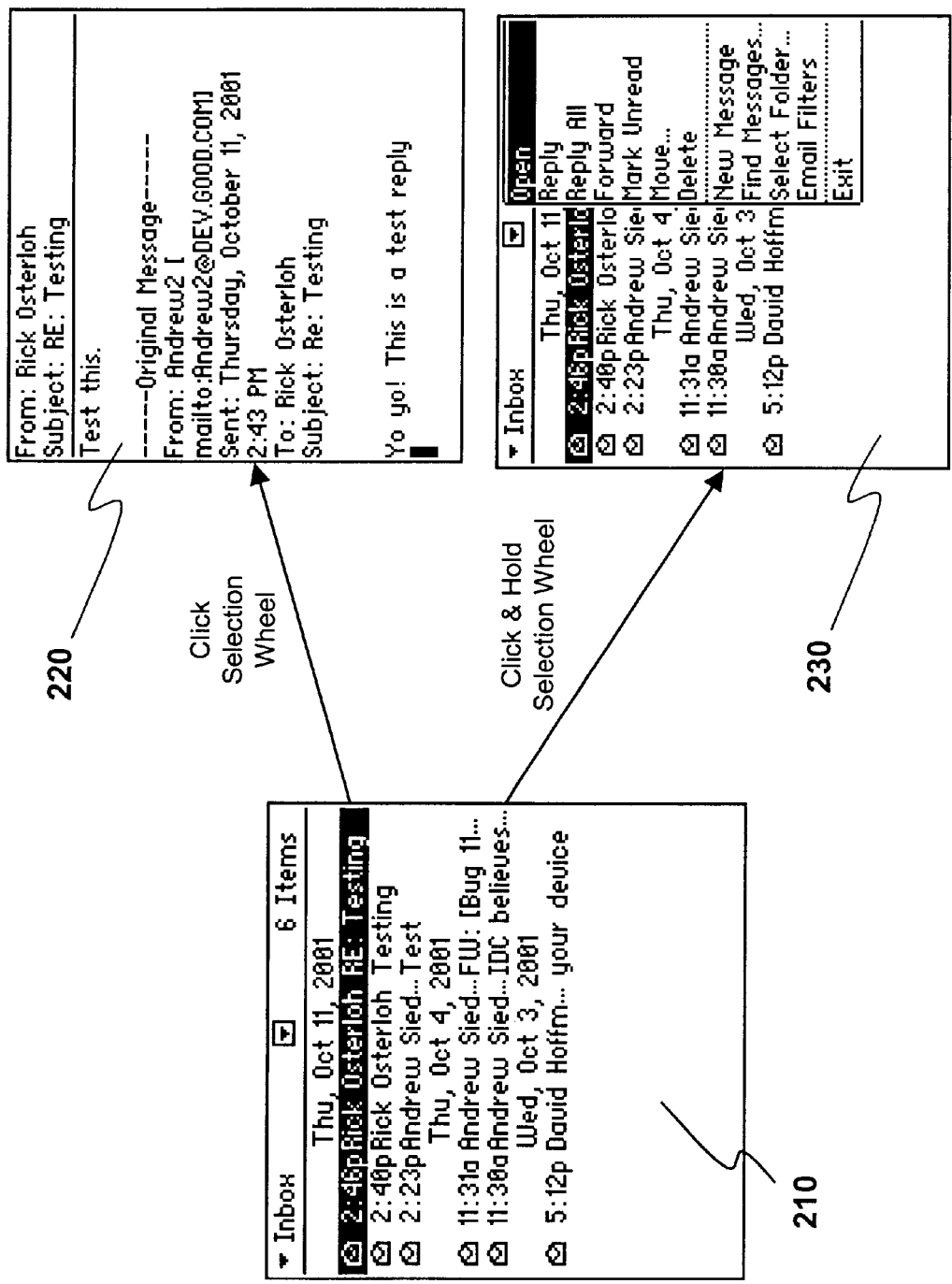
FIG. 2 illustrates a user interface employing a dual function selection element according to one embodiment of the invention.

An exemplary group of email message headers are illustrated in screen 210 of FIG. 2. In one embodiment, clicking the thumbwheel 140 performs a default action associated with the highlighted message such as, for example, opening the message, as illustrated in screen 220. By contrast, holding the thumbwheel 140 may display a context-sensitive menu of other actions as indicated in screen 230 (e.g., open, reply, reply all, forward, . . . etc). Various other email-related actions may be included within the context-sensitive action menu while still complying with the underlying principles of the invention.

Figure 3A:
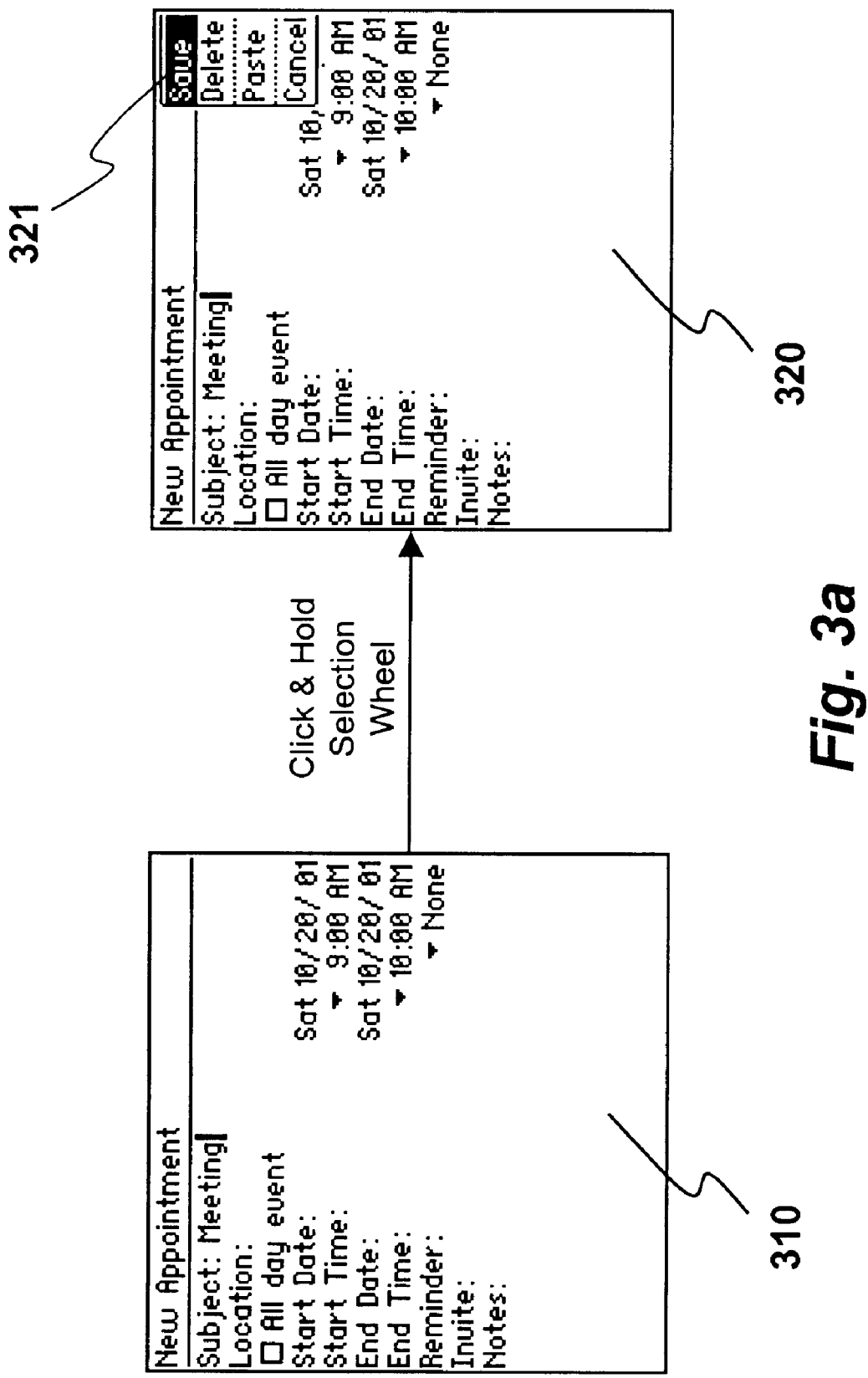
FIGS. 3a–b illustrate one embodiment of the invention employed within an electronic calendar application.

In one embodiment, within a 'Create New Appointment' screen 310 illustrated in FIG. 3a, when the cursor is located in a simple text field (i.e., with no special widget), holding the thumbwheel opens a context-sensitive action menu 321, shown in screen 320. The action menu 321 includes various action items associated with the new appointment including, but not limited to, save, delete, paste, cancel, . . . etc.

Figure 3B:
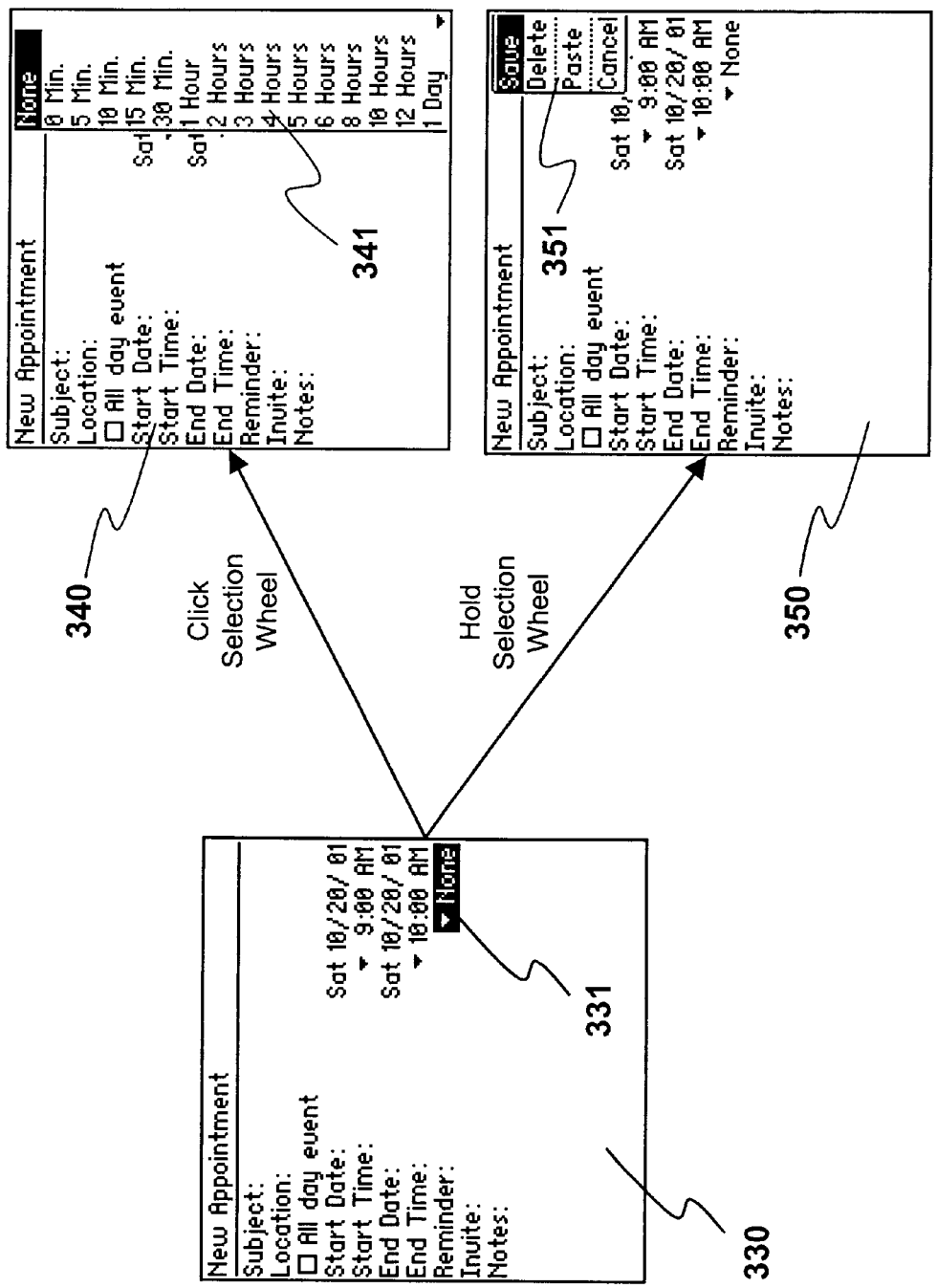

As illustrated in the screen shots 330, 340, and 350 in FIG. 3b, in a field 331 which contains a special widget (e.g., in this case, a time selection widget) clicking on the thumbwheel 140 brings up the list of choices associated with the field. Thus, clicking on thumbwheel when the time field 331 is highlighted in screen 330 brings up a list of potential times 341 shown in screen 340. In one embodiment, holding the thumbwheel in the same situation brings up a context-sensitive menu 351 shown in screen 350 (e.g., including action items save, delete, paste and cancel). Various other data selection choices and/or action items may be used while still complying with the underlying principles of the invention.

Email Addressing and Address Book Name Lookup

Addressing messages is a complex part of composing email messages. The task is more difficult on small form factor devices with limited screens and input devices. To ease this task, one embodiment of the invention allows the user to type the fewest keystrokes possible to generate a list of names from which to choose from the user's address book. At the same time, the user is also provided with the ability to enter the address of a user not found in the address book. By contrast, other systems require more keystrokes and/or menu choices to enter a name and often require the user to know whether the name is already stored in the address book or is a new entry before addressing begins.

One embodiment of the invention employs "type-down addressing" in which matching names are continually generated from the address book. As each character is typed, the list of possible matches is refined and the user can choose from the list of names or simply keep typing. If no matching names are found, the user simply types the complete address. Type down addressing may be employed in any application containing a list of names or addresses (e.g., to find the entry of a contact in a contact list, to find an email address, . . . etc).

Figure 4:
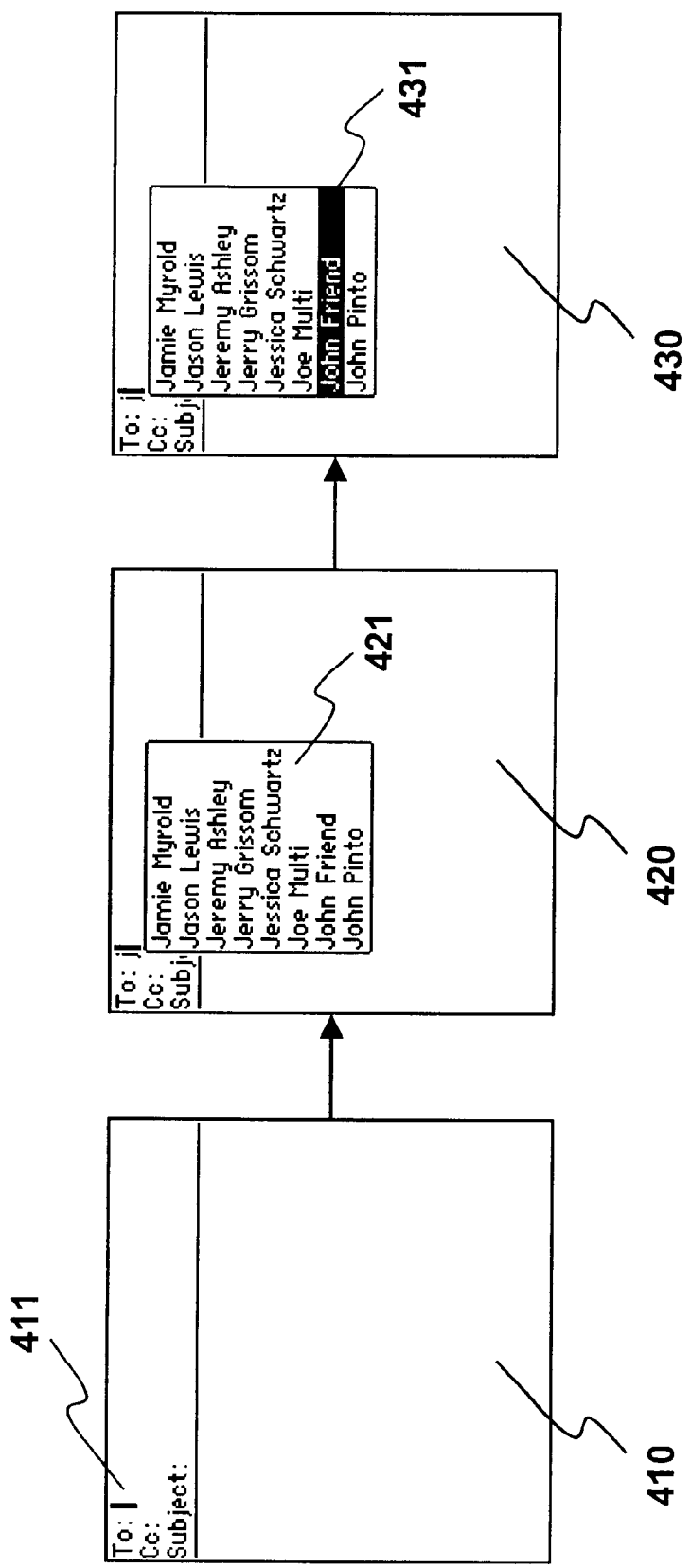
FIG. 4 illustrates one embodiment of the invention for selecting an address.

One specific example of type down addressing will now be described with respect to FIG. 4. Screen 410 is a "compose new message" screen in which the address field 411 is completely blank. On screen 420, after a "J" is typed, all names starting with "J," whether first names or last names, are automatically generated in an address list 421. Thus, the name "Bob Jones" would be included in the address list even though the first name "Bob" begins with a "B." In one embodiment, "Bob Jones" and other first names not beginning with a "J," would appear after all of the entries having "J" as the first letter of the first name. However, as described below, in one embodiment, typing a space after the "J" would refine the list to remove Bob since it would be clear that the "J" was for the first name only.

As indicated in screen 430, having typed the single character "J," the user may now pick a name from the list. In one embodiment, this is accomplished by scrolling down with the thumbwheel 140 and clicking the thumbwheel to select the highlighted name 431.

Figure 5C:
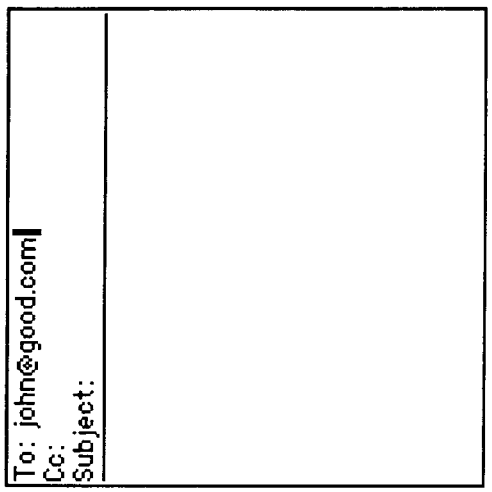
FIGS. 5a–c illustrate different embodiments of the invention used for address selection.
Figure 5B:
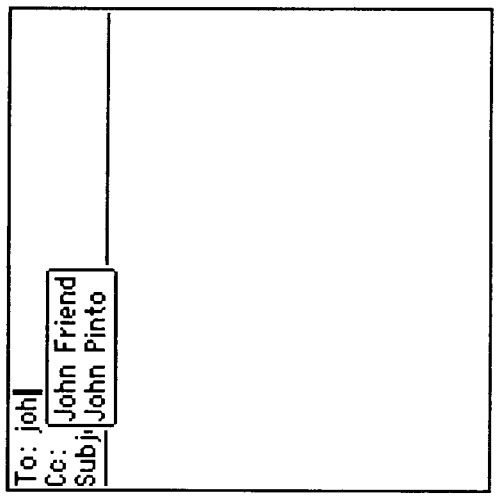
Figure 5A:
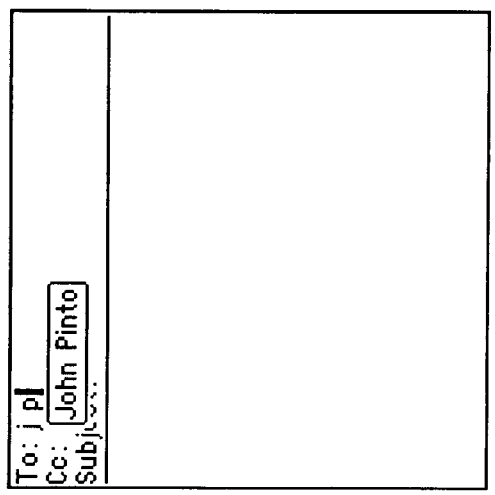

Instead of scrolling into the list as described above, the user may type a space and then a "P" following the "J" as shown in FIG. 5a. There is only one entry in the address book with a first name that starts with "J" and a last name that starts with "P" (John Pinto). That name is displayed and the user may select it as described above (i.e., scrolling into the list and clicking via the thumbwheel).

In addition, instead of narrowing on first and last names simultaneously, the user can simply type additional characters of the first name and the suggested list is immediately refined as illustrated in FIG. 5b. As shown in FIG. 5c, if the user wants to send the message to an address not in the address book, the user simply keeps typing the complete address and the match list automatically disappears.

In one embodiment, for added efficiency, certain easy-to-type shortcuts for common address elements are provided. For example, instead of having to type complex shift sequences to get the "@" character, the user simply types space (or another designated key) twice. Then, instead of having to type "." "c" "o" "m", the user can type space twice again. For example, to enter the address john@good.com, the user would type "john," space-space "good," space-space. In addition, in one embodiment, each additional space typed after the ".com" appears will cycle through ".net", ".gov" and ".org"

Figure 6:
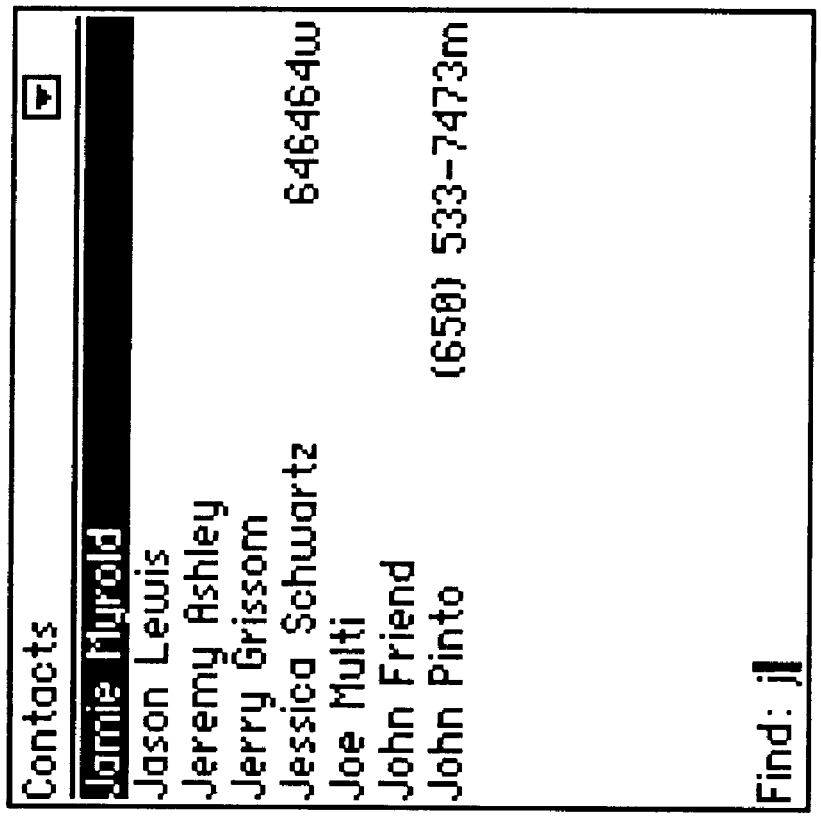
FIG. 6 illustrates an embodiment of the invention used for selection of a contact name from a list.

FIG. 6 illustrates the name finding techniques in an address book itself rather than in an email header. Note that, in this embodiment, the refined names aren't shown in a pop up, but rather the list of address entries shrinks on the main screen. In addition, in one embodiment, the partial match may include a company name as well as the person's first and last names. Accordingly, it would find "Tom Smith" at "Jones Corporation" in addition to "John Friend" and "Bob Jones."

Widget Interactions

Figure 7:
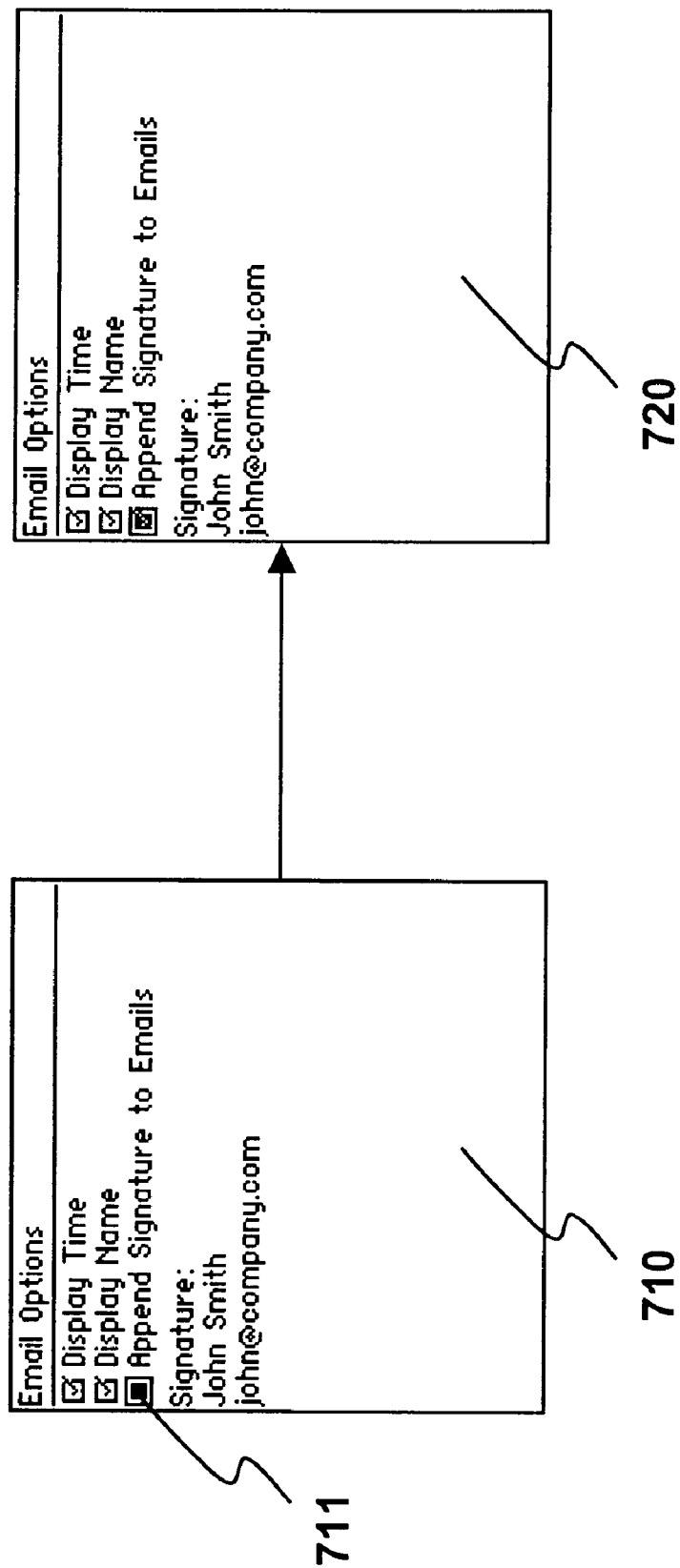
FIG. 7 illustrates one embodiment of the invention for selecting a check-box.

One embodiment of the invention provides improved techniques for interacting with User Interface elements ("widgets") on a small handheld device with limited input options. The widget set includes, but is not limited to, checkboxes, dropdowns, and navigation buttons. As illustrated in FIG. 7, in an options screen 710 for an email application, the user has scrolled using the thumbwheel 140 onto a check field widget 711 (i.e., the checkbox for turning automatic signatures on and off). In one embodiment, clicking the thumbwheel 140 toggles the check field 711, checking and un-checking it, as indicated in screen 720.

Figure 8:
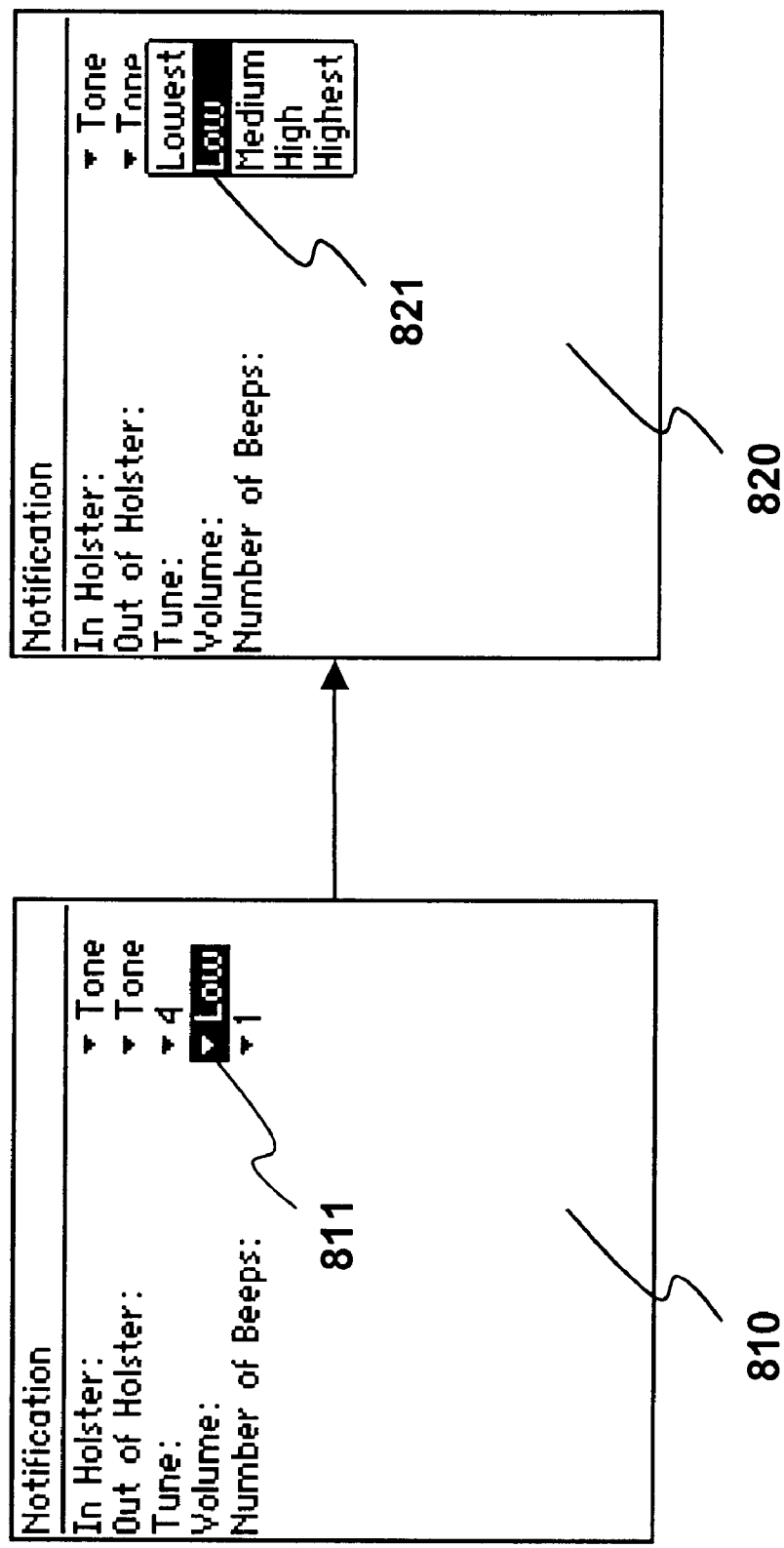
FIG. 8 illustrates data selection via a widget according to one embodiment of the invention.

As illustrated in FIG. 8, in a notifications screen 810, using the scroll thumbwheel 140 to move down, a user may select the widget 811 that controls ring volume of the data processing device. Clicking the thumbwheel 140 activates the widget 811 allowing the user to scroll through the choices for the field until the desired choice 821 is highlighted (as shown in screen 820). Clicking the thumbwheel 140 again selects the highlighted entry.

Figure 9:
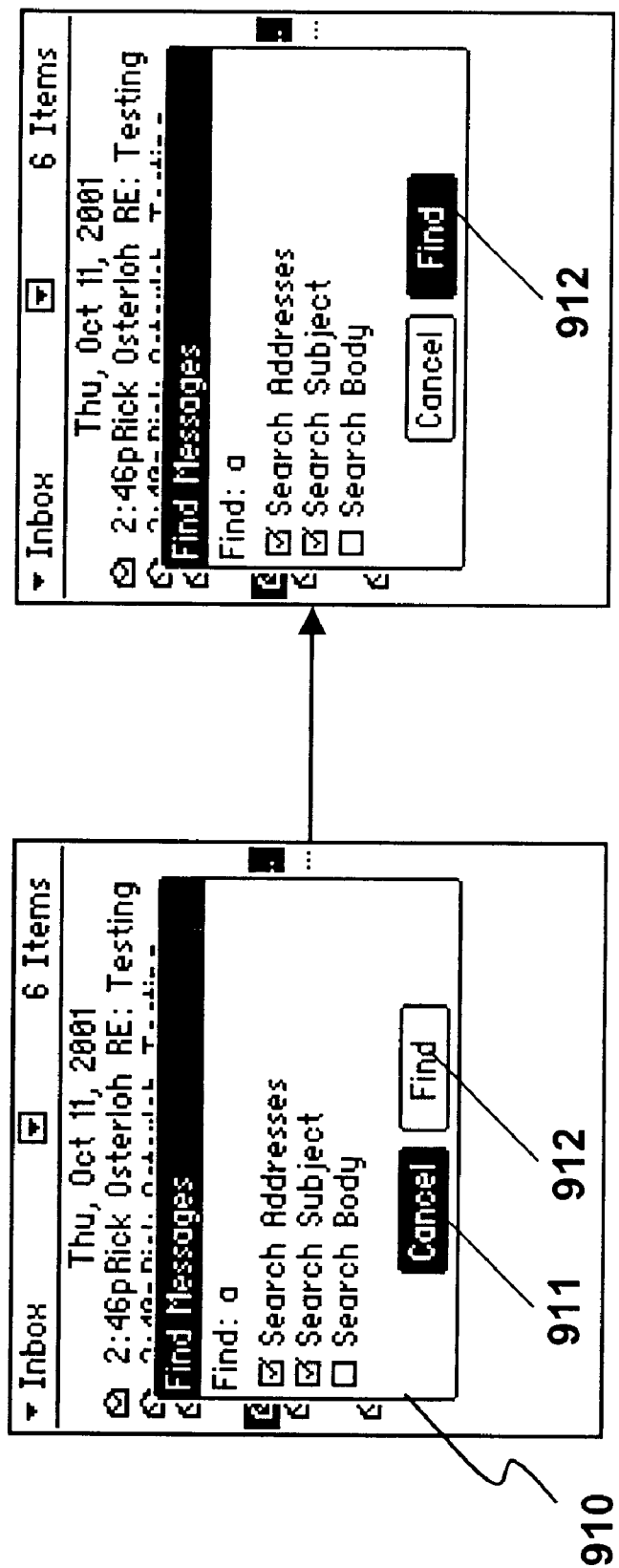
FIG. 9 illustrates selection of pop-up menu commands according to one embodiment of the invention.

As illustrated in FIG. 9, in a "Find Messages" pop-up 910, the Cancel button 911 is highlighted. In one embodiment, scrolling the thumbwheel 140 moves to the other (or through multiple in sequence) buttons (e.g., the Find button 912). In one embodiment, clicking the thumbwheel 140 then activates the highlighted button.

Home Screen

Figure 10:
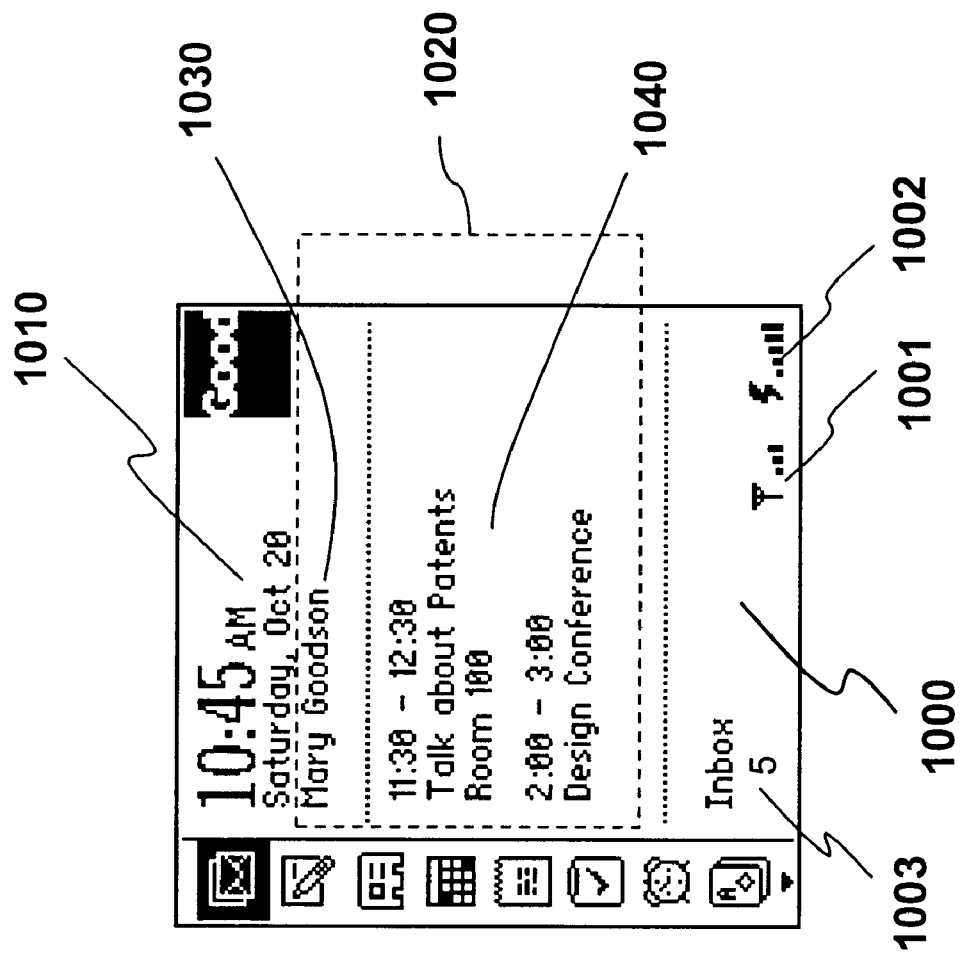
FIG. 10 illustrates a home screen according to one embodiment of the invention.

As illustrated in FIG. 10, one embodiment of a home screen 1000 for the data processing device offers multiple features in a compact space. Specifically, the home screen 1000 provides for efficient selection from a plurality of available applications. One embodiment of the home screen includes a time and date area 1010. In addition, a personalization area 1020 may be defined for continually displaying certain user-selectable data. For example, in the particular embodiment illustrated in FIG. 10, the personalization area 1020 includes the name of the user 1030 and upcoming appointments 1040 (e.g., those programmed within the user's electronic calendar application).

Various other types of conveniently-displayed information may be provided in the home screen 1000, including, for example, radio signal strength ("RSSI") 1001, battery power 1002, the number of unread messages in the inbox 1003 and number of messages in the outbox (not shown), awaiting transmission.

Task Switching

One embodiment of the invention provides for improved application switching by preserving application context and by displaying the taskbar under certain conditions to select another application. In one embodiment, a dedicated hardware key is provided so that the user may access the taskbar at any point in time.

Referring to FIG. 11a, from the home screen 1000 a user may click the thumbwheel 140 to open the inbox 1007. As indicated in the inbox screen 1110, from the inbox, the user may scroll down to a message and click the thumbwheel 140 to open it. On the subsequent message screen 1120, a question is asked that the user cannot answer without looking at his/her electronic calendar, a separate application.

In one embodiment, holding and/or clicking the thumbwheel 140 brings up a context-sensitive menu 1130 shown in FIG. 11b. Scrolling down the menu 1130, the user may click the thumbwheel 140 to expose an application list 1140. Alternatively, or in addition, a specified control key or combination of keys may be provided to bring up the application list 1140 (e.g., such as CTRL+Tab in Windows).

In screen 1150, the user scrolls down to the calendar icon 1151 in the application list 1140. Clicking the calendar icon 1151 with the thumbwheel 140 causes the calendar 1160 to appear on the current date as illustrated in FIG. 11c. Having the answer to the question from screen 1160, the user exposes the menu 1130 again (or, alternatively, brings up the taskbar 1140 directly as described above). The user scrolls down the menu to highlight the taskbar 1140 and clicks the thumbwheel. The taskbar 1140 appears over the exposed application (in this case the calendar 1160). The user scrolls up the taskbar 1140 with the thumbwheel selecting the inbox application 1161 as illustrated in FIG. 11d. Clicking the inbox application icon 1161 re-exposes the inbox, with the message 1120 that was being viewed still opened.

Folder Navigator

Unlike other GUIs which do not allow users to file information from a handheld device, one embodiment of the invention allows users to manage messages in a mobile filing system that mirrors their server-based information hierarchies.

Figures 12A, 12B:
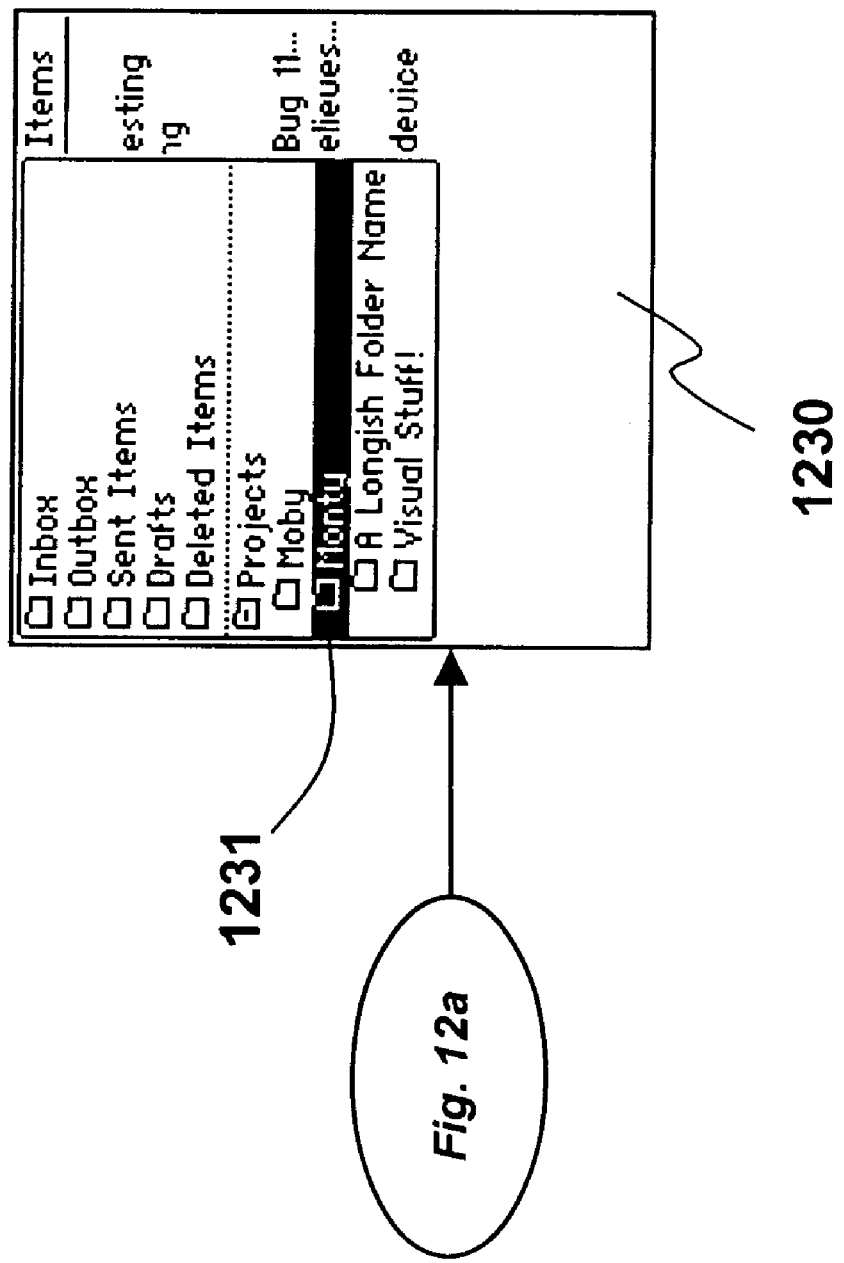
FIGS. 12a–b illustrate folder navigation according to one embodiment of the invention.

As illustrated in FIG. 12a, on the inbox email header list, the user has selected the folder list pop up widget (e.g., by using the thumbwheel 140 to navigate upward beyond the first message). The current folder name ("Inbox") is shown in the collapsed folder popup 1210. Clicking the popup expands it into a menu 1211. The popup 1211 shows the standard folders and/or the user's individual folders. In one embodiment, the standard folders are shown above a dotted line in the popup menu 1211.

On screen 1220, the thumbwheel 140 has been used to scroll down to the Projects folder 1221. The "+" on the folder indicates that there are sub-folders. Clicking on a "+" folder opens the list of subfolders, as illustrated. In screen 1230 shown in FIG. 12b, the user has scrolled down to one of the sub-folders 1231 with a "+" and opened it as well. In one embodiment, clicking the thumbwheel on a folder that doesn't have sub-folders (or whose sub-folders have already been exposed) selects the folder and collapses the popup. The message header list may then reflect the contents of that new folder.

Notification Override

Figure 13:
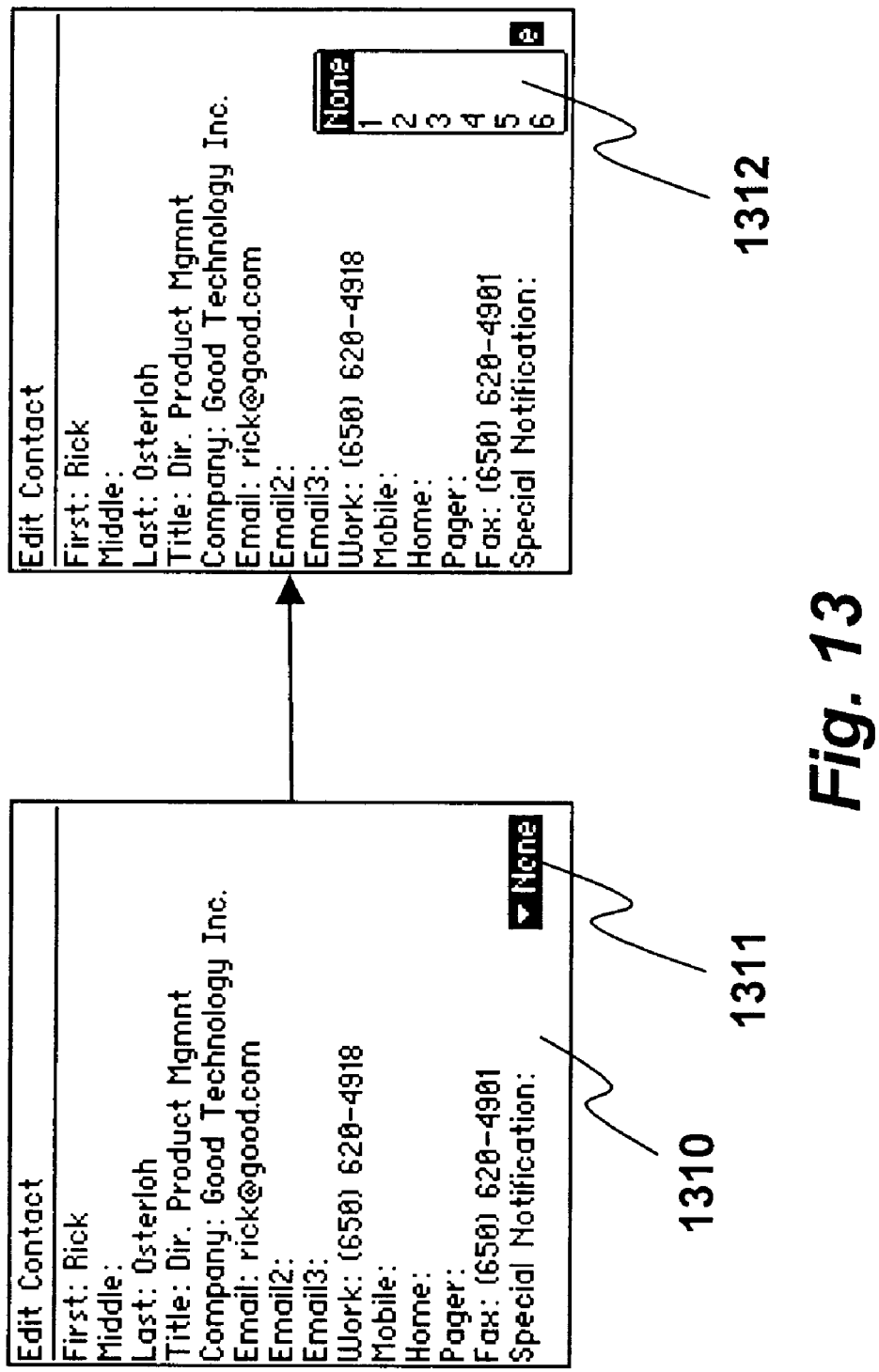
FIG. 13 illustrates data selection from a contact field according to one embodiment of the invention.
Figure 14:
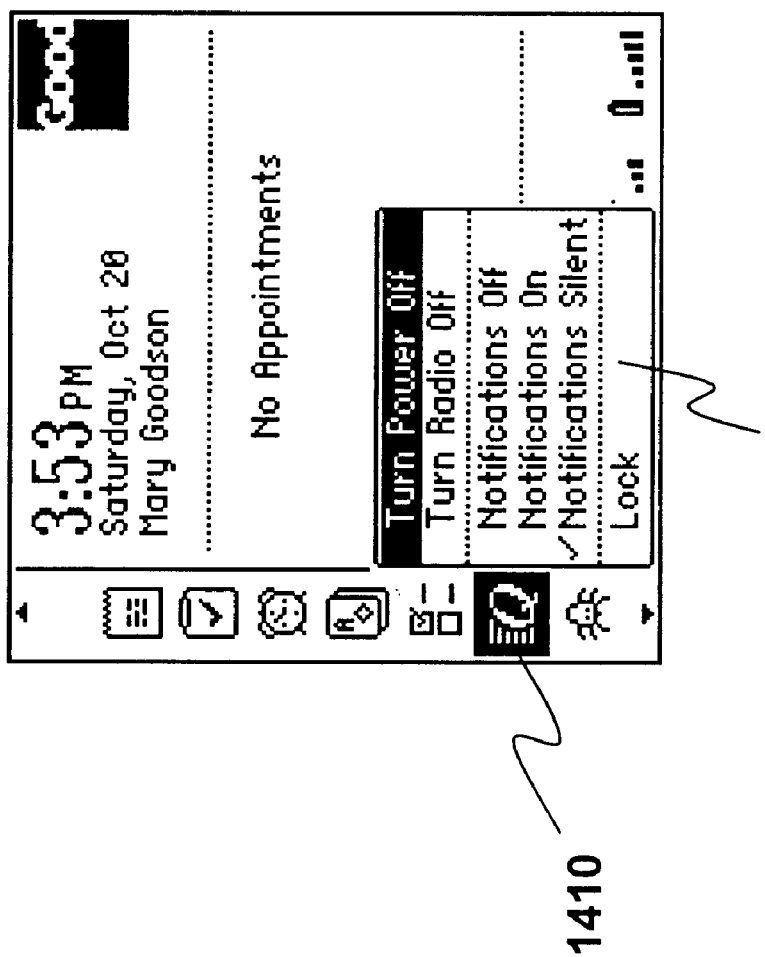
FIG. 14 illustrates a quick menu according to one embodiment of the invention.

One embodiment of the system allows a user to assign a specific notification tone to a user to indicate that a message from the user has arrived. As illustrated in FIG. 13, the user opens the "Address Book" application and selects the contact entry 1310 for whom special notification is desired. The user scrolls to the "Special Notification" field 1311. Clicking the thumbwheel opens the list of special ring tones 1312 that can be associated with this contact.

Quick Settings

In one embodiment, quick access is provided to certain critical settings via a quick access icon 1410 from the taskbar. For example, as indicated in the quick settings menu 1411, the notification settings may be efficiently switched between normal (e.g., "on"), silent or off (e.g., from a tonal ring to a quiet vibration, including for special notifications). For reasons of safety and/or courtesy, radios or tones must often be controlled (e.g., on an airplane, during a meeting, in a library, . . . etc). The quick settings menu provides a quick, efficient way to control the tones which is not found in other handheld data processing devices and systems.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, while the embodiments described above use a selection wheel for selecting data, various other data input devices may be used while still complying with the underlying principles of the invention (e.g., a standard mouse).

In addition, as mentioned above, all of the functions and modules described herein may be implemented in software (e.g., and executed on a general purpose processor), hardware (e.g., such as an application specific integrated circuit ("ASIC")), or any combination thereof.

It is also important to note that the apparatus and method described herein may be implemented in environments other than a physical integrated circuit ("IC"). For example, the circuitry may be incorporated into a format or machine-readable medium for use within a software tool for designing a semiconductor IC. Examples of such formats and/or media include, but are not limited to, computer readable media having a VHSIC Hardware Description Language ("VHDL") description, a Register Transfer Level ("RTL") netlist, and/or a GDSII description with suitable information corresponding to the described apparatus and method.

Accordingly, the scope and spirit of the invention should be judged in terms of the claims which follow.

What is claimed is:

1. A user interface on a data processing device comprising:

an input wheel rotatably mounted to said data processing device and configured to generate input signals to said data processing device when rotated or clicked, wherein clicking and holding down said input wheel for less than a threshold amount of time causes a first function to be executed by said data processing device, said first function having a default action associated with a data object highlighted on a display of said data processing device, and wherein clicking and holding down said input wheel for greater than said threshold amount of time causes a second function to be executed by said data processing device, said second function having a context-sensitive menu associated with said highlighted data object.

2. The user interface as in claim 1 wherein said first function and said second function change based on which application is currently being executed on said data processing device.

3. The user interface as in claim 2 wherein said first function and said second function change based on a current state of said application.

4. The user interface as in claim 3 wherein said current state comprises a specific set of data displayed within said application.

5. The user interface as in claim 4 wherein said application is an email application and specific set of data comprises an inbox of said email application.

6. The user interface as in claim 1 wherein said data object is an email message header identifying an email message.

7. The user interface as in claim 1 wherein said data object is highlighted based on a cursor being positioned within or substantially adjacent to said data object.

8. The user interface as in claim 1 wherein said default action comprises opening said data object.

9. The user interface as in claim 8 wherein said context-sensitive menu comprises a list of secondary actions which may be performed on said data object.

10. The user interface as in claim 9 wherein one of said secondary actions is copying said data object to a new folder.

11. The user interface as in claim 1 wherein said first function comprises a default action associated with an identified data field in which a cursor resides and wherein said second function comprises a context-sensitive menu associated with said data field.

12. The user interface as in claim 11 wherein said default action comprises generating a menu of potential data entries for said data field, data entries being selectable from said list by scrolling said input wheel to highlight said data entries.

13. The user interface as in claim 12 wherein said context-sensitive menu comprises one or more secondary actions associated with said data field.

14. The user interface as in claim 13 wherein one of said secondary actions comprises pasting previously-copied data into said data field.

15. A method comprising:

executing a first function on a data processing device responsive to an input wheel on said data processing device being clicked and held down for less than a threshold amount of time, said first function having a default action associated with a data object highlighted on a display of said data processing device; and executing a second function on said data processing device responsive to said input wheel being clicked and held down for more than said threshold amount of time, said second function having a context-sensitive menu associated with said highlighted data object.

16. The method as in claim 15 wherein said first function and said second function change based on which application is currently being executed on said data processing device.

17. The method as in claim 16 wherein said first function and said second function change based on a current state of said application.

18. The method as in claim 17 wherein said current state comprises a specific set of data displayed within said application.

19. The method as in claim 18 wherein said application is an email application and specific set of data comprises an inbox of said email application.

20. The method as in claim 15 wherein said data object is an email message header identifying an email message.

21. The method as in claim 15 wherein said data object is highlighted based on a cursor being positioned within or substantially adjacent to said data object.

22. The method as in claim 15 wherein said default action comprises opening said data object.

23. The method as in claim 22 wherein said context-sensitive menu comprises a list of secondary actions which may be performed on said data object.

24. The method as in claim 23 wherein one of said secondary actions is copying said data object to a new folder.

25. The method as in claim 15 wherein said first function comprises a default action associated with a identified data field in which a cursor resides and wherein said second function comprises a context-sensitive menu associated with said data field.

26. The method as in claim 25 wherein said default action comprises generating a menu of potential data entries for said data field, data entries being selectable from said list by scrolling said input wheel to highlight said data entries.

27. The method as in claim 26 wherein said context-sensitive menu comprises one or more secondary actions associated with said data field.

28. The method as in claim 27 wherein one of said secondary actions comprises pasting previously-copied data into said data field.

29. A method comprising:
identifying a data object on a data processing device display responsive to rotation of an input wheel;
performing a first function if said input wheel is pressed down for less than a first predetermined period of time, said first function having a default action associated with said identified data object; and
performing a second function if said input wheel is pressed down for longer than said first predetermined period of time, said second function having a context-sensitive menu associated with said identified data object.

30. The method as in claim 29 wherein said secondary action comprises generating a menu of options associated with said data object.

31. The method as in claim 29 wherein said data object is a data entry field.

32. The method as in claim 29 wherein said data object is an email message header.

* * * * *